United States Patent [19]

Godoy et al.

[11] Patent Number: 5,118,721
[45] Date of Patent: Jun. 2, 1992

[54] DISPERSION POLYMER POLYOLS

[75] Inventors: Jose Godoy, Geneva; Jitka Jenc, Versoix; Werner A. Lidy, Collonge-Bellerive, all of Switzerland

[73] Assignee: Polyol International, B.V., Aert Van Nesstraat, Netherlands

[21] Appl. No.: 397,244

[22] Filed: Aug. 23, 1989

[30] Foreign Application Priority Data

Sep. 8, 1988 [GB] United Kingdom ............... 8821058

[51] Int. Cl.⁵ .............................................. C08J 9/00
[52] U.S. Cl. .................................. 521/103; 521/128; 521/137; 524/701; 524/720; 524/725; 524/728; 524/827; 524/832; 524/836
[58] Field of Search ............... 521/99, 137, 157, 107, 521/135, 136; 524/701, 720, 728, 725

[56] References Cited

U.S. PATENT DOCUMENTS 4,293,657 10/1981 Nissen et al. .................... 521/121
4,977,194 12/1990 Haas et al. ......................... 521/99

Primary Examiner—Morton Foelak
Assistant Examiner—Shelley Wright
Attorney, Agent, or Firm—Nixon & Vanderhye

[57] ABSTRACT

A process for preparing a dispersion of a filler e.g., melamine, urea or borax in a dispersion or graft polymer polyol is provided. The process comprises (1) dispersing the filler in a suitable basestock (e.g., a polyether polyol) and (2) thereafter using this as the basestock for preparing the dispersion or graft polymer polyol.

The polymer which is prepared in dispersed form in the second step may be for example (1) the reaction product of a polyamine, hydrazine or hydrazide and an isocyanate (PHD polymer) or (2) the reaction product of an olamine and an isocyanate (PIPA polymer). Alternatively styrene and acrylonitrile can be graft polymerised in the basestock in step (2). The new dispersion or graft polymer polyols containing dispersed filler are useful in the manufacture of fire resistant polyurethane foam for e.g., furniture applications.

13 Claims, No Drawings

DISPERSION POLYMER POLYOLS

The present invention relates to inter alia melamine or urea containing dispersion or graft polymer polyols suitable for use in the manufacture of fire resistant flexible polyurethane foam.

The flammability of polyurethane foam is a well known phenomenon which now limits its use in furniture applications. A case in point is the United Kingdom where in view of recent, well publicised domestic accidents, legislation is being adopted which now requires polyurethane foam to meet new more rigorous flammability standards. As many presently available foams cannot meet these standards, there is now a need for new polyurethane foams which are less flammable than known previously.

An approach to solving this problem was developed by Bridgestone (GB 1585750) and BASF (see for example U.S. Pat. No. 4,258,141) in the late 1970's. Their solution to this problem was to incorporate quantities of melamine into the polyurethane foam during its formulation.

The most convenient way of introducing melamine into the formulation is to first disperse it into the polyol component. However when this was done it is necessary to use the polyol immediately since the melamine settles out of the dispersion rapidly and thereafter can not easily be redispersed. This problem has been addressed by BASF in U.S. Pat. No. 4,293,657 for conventional polyether polyols. U.S. Pat. No. 4,293,657 discloses using a stabiliser selected from silicic acid, perfluorinated alkyl carboxylic acids and salts of fatty alcohols to reduce settling.

A similar problem is encountered when polyols containing polymer particles (e.g. dispersion or graft polymer polyols) are employed instead of a conventional polyether polyol. This is now a particularily significant problem as, for reasons of quality and comfort the furniture industry now prefers to use flexible, high resilience polyurethane foam made from dispersion or graft polymer polyols. Hence, in future, most foam manufacturers will wish to incorporate melamine into such materials.

In view of the above, the problem to be solved is to improve the storage stability of melamine dispersions in dispersion or graft polymer polyols.

According to the present invention there is provided a process for preparing a dispersion of filler in a dispersion or graft polymer polyol which comprises the steps of:
(a) dispersing the filler in a basestock selected from polyether polyols, polyester polyols, polylactone polyols or polytetrahydrofuran polyols.
(b) thereafter carrying out a dispersion or graft polymerisation in the product of step (a) to prepare a dispersion of the filler in a dispersion or graft polymer polyol.

The present invention solves the problem of storage stability by incorporating the melamine into the basestock, from which the dispersion or graft polymer polyol is prepared, immediately prior to the formation of the polymer. This is to be contrasted with the addition of the melamine or urea to the final dispersion polymer polyol disclosed in, for example, GB 2163762. It has been observed that the product of the former process is more resistant to settling of the melamine than the product of the latter.

It has also been found that this phenomenon is more generally applicable than merely to melamine and that in practice the stability of a range of filler dispersions is improved.

An additional advantage of the process of the present invention is that polyurethane foams produced from its products exhibit improved physical properties. In particular the same flammability response at a lower level of filler can be obtained for the British Standard 5852 Part 2 crib 5 test. Furthermore hydrophilic fillers can be used without deterioration of foam physical properties after humidity exposure.

As regards the particle size of the filler, this is preferably in a form where at least 90% of the particles are smaller than 15 microns in diameter. Suitably between 1 and 150 parts by weight of such a filler can be dispersed in 100 parts by weight of the basestock. For most applications a preferred range is between 1 and 40 parts by weight per 100 parts of basestock. The filler is suitably selected from one or more of melamine, urea, urethane, borax, dicyanodiamide, guanidine, melamine/formaldehyde resins, urea/formaldehyde resins and inorganic fillers such as calcium carbonate, aluminum hydroxide and polyammonium phosphate. Preferred fillers are melamine, urea, dicyanodiamide, borax or mixtures thereof.

The basestock, which acts as the dispersion medium for both the polymer and the filler, is selected from polyether polyols, polyester polyols, polylactone polyols or polytetrahydrofuran polyols. If the basestock is a polyether polyol, it is typically produced by alkoxylation of an appropriate starter molecule with an alkylene oxide. Examples of starter molecules include (1) low molecular weight diols, triols and naturally occurring polyols, (2) non reducing sugars and derivatives thereof, (3) phosphoric, phosphorous and polyphosphoric acid and (4) low molecular weight diamines, triamines and hydrazine. Specific examples include ethylene glycol, propylene glycol, glycerol, trimethylol propane, pentaerythritol, sorbitol, arabitol, manitol, alkyl and alkylene glycol glucosides and glycerol glucosides. The alkoxylating agent is suitably a $C_2$ to $C_6$ alkylene oxide, preferably ethylene oxide, propylene oxide, butylene oxide or mixtures thereof. Details of the alkoxylation process which generates the polyether polyols will be familiar to the skilled man. Suitable polyether polyols are those having a hydroxyl number in the range 10 to 150 preferably 20 to 60 and a molecular weight in the range 200 to 16,000 preferably 500 to 10,000.

Suitable polyester polyols comprise the reaction products of polyfunctional, e.g. di-and/or trifunctional alcohols, with a polyfunctional carboxylic acid or an ester or anhydride derivative. The polyfunctional alcohol may be, for example, a $C_2$ to $C_{10}$ diol, glycerol, trimethylol propane and higher glycols, e.g. diethylene glycol, triethylene glycol, dipropylene glycol etc. The polycarboxylic acid may be aliphatic, cycloaliphatic, aromatic or heterocyclic and includes such materials as succinic acid, adipic acid, sebacic acid, suberic acid, maleic acid, fumaric acid, trimellitic acid, phthalic acid, glutaric acid, etc. Corresponding anhydrides and esters form further examples.

Examples of polylactones include materials derived from polymerisation of epsilon-caprolactone.

Considering next the polymer which is produced in situ in the filler/basestock dispersion in dispersed or graft form during step (b), the invention is applicable to two main types. The first type of polymer which is produced in dispersed form in the filler/basestock dispersion, comprises for example the product of the reaction of a polyamine, hydrazine or hydrazide with a mono or polyfunctional isocyanate, and hence is a polyurea or a polyhydrazodicarbonamide. These are known in the art as PHD polymers. The manufacture of PHD dispersion polymer polyols, which is described in more detail in GB 1501172, involves stirring together any polyamine, hydrazine, N,N'-substituted hydrazines or hydrazides of a di- or tricarboxylic acid with any aliphatic, cycloaliphatic, aromatic or heterocyclic isocyanate in a basestock in amounts such that the NCO:NH equivalent ratio is in the range 0.8:1 to 1.05:1. Typical examples of isocyanates include the isomers of toluene diisocyanate and di(4-isocyanatophenyl) methane (MDI) and its oligomers.

PHD dispersion polymer polyols according to the present invention are suitably prepared by a variation of this process in which introducing the filler/basestock dispersion, the polyamine, hydrazine or hydrazide and the isocyanate are introduced into a flow mixer at a temperature in the range ambient to 150° C. In order to obtain good dispersions it is necessary to mix the components thoroughly whilst they are reacting.

An alternative example of this type of polymer, which comprises the reaction of an olamine with an isocyanate, has been described in for example U.S. Pat. No. 4,374,209. Typical olamines include primary, secondary or tertiary alkanolamines e.g. monoethanolamine, diethanolamine, triethanolamine N-methyldiethanolamine, dipropanolamine and the like. Further examples may be found in U.S. Pat. No. 4,374,209. The isocyantes to be used are those described above for PHD polymers and the equivalent ratio of NCO:NH is suitably between 0.8:1 and 1.1:1. For this type of polymer it is preferable to carry out the polymer forming reaction by stirring the olamine and the isocyanate together in the filler/basestock dispersion at between room temperature and 70° C. Further details of the process may be found in the above mentioned patent. Dispersion polymer polyols generated in this way are usually known in the art as PIPA dispersion polymer polyols with the polymer being known as PIPA polymer.

Finally two other types of polymers which can be prepared in dispersed form in the filler/basestock dispersion are polyepoxides and polyoxamates. The synthesis of such polymers are disclosed respectively in U.S. Pat. No. 4,789,690 and U.S. Pat. No. 4,407,983 whose disclosures are incorporated herein by reference.

The preparation of the second type of polymer, characterised by being grafted onto the basestock, is well known. As applied to the present invention the grafting process comprises polymerising or copolymerising one or more olefin monomers in the filler/basestock dispersion at elevated temperature in the presence of a free-radical initiator such as a peroxide or the like. Preferred monomers include styrene, acrylonitrile, methyl methacrylate or mixtures of any two or all of them. Most preferred is the copolymerisation of styrene and acrylonitrile. More details of the grafting process can be found on U.S. Pat. No. 3,304,273, U.S. Pat. No. 3,383,351 and U.S. Pat. No. Re. 28,715.

As mentioned above, the process of the present invention involves first dispersing the filler in the basestock and thereafter forming the polymer in situ. It is important that the second step of the process is carried out reasonably soon after the initial dispersion of the filler as the filler/basestock dispersion is somewhat unstable. The product after the second step is generally white and milky.

Whilst not wishing to be held to any theory it is believed that the reason why the products of the process of the present invention exhibit superior storage stability is that, during the second step of the process, the filler particles become coated with polymer and hence become more compatible with the basestock.

The dispersion or graft polymer polyols containing the dispersed filler are used primarily for the manufacture of polyurethane foam. Such polyurethane foams are prepared by formulating them with a di- or polyfunctional isocyanate, a catalyst for the formation of urethane linkages (i.e. a base) blowing agent optionally in the presence of further basestock(s). After formulation, foaming and curing is allowed to occur in the normal way. It is preferred that this process is used to prepare high resilience polyurethane foam.

For the purposes of preparing the formulation any di- or polyfunctional isocyanate defined above can be used although preference is given to isomers of toluene diisocyanate or di(4-isocyanatophenyl) methane and its oligomers. As regards the blowing agent, e.g. water, halocarbons, permanent gases etc., and catalysts, e.g. amine or tin catalysts, these will be familiar to the skilled man.

In addition to the above components, other additives, e.g. HR surfactants, foam stabilisers, fillers, pigments etc. may also be added. Additional flame retardants e.g. phosphorus containing compounds can also be added to improve the foams further.

The invention will now be defined with reference to the following Examples.

EXAMPLE 1

Preparation of a PIPA dispersion polymer polyol containing dispersed melamine 1800 g of a glycerine started polyether of propylene oxide capped with 10% ethylene oxide (hydroxyl number=56; molecular weight=3000; primary hydroxyl content 50%) was vigorously stirred at 20°–22° C. for four minutes with 400 g of melamine (ex DSM). At the end of this time, 96.68 g of triethanolamine was added with stirring followed 10 seconds later by 101.07 g of toluene diisocyanate (80% 2,4-isomer; 20%, 2,6-isomer). A further 10 seconds later, 0.44 g of dibutyl tin dilaurate was added. Stirring was then continued for a further 10 seconds. During this time the temperature rose to ca 45° C. The product obtained was a milky white dispersion and analysed as having a melamine content of 20 parts by weight per 100 parts of total dispersion.

EXAMPLE 2

Comparative Test

Example 1 was repeated except that the addition of the melamine was carried out after the PIPA polymer had been formed. The product of Example 2 was also milky white.

EXAMPLE 3

Storage Stability Test

Samples of the products of Example 1 and Example 2 were placed in glass beakers and their stability compared visually. It was noticeable that the product of Example 1 was significantly more stable than that of Example 2.

EXAMPLES 4-6

Examples 1-3 were repeated except that 400 g of urea was used instead of melamine.

Again it was noticeable that the product of Example 4 was more stable than Example 5.

EXAMPLE 7

Preparation of Polyurethane Foams

The following formulations were prepared and allowed to foam and cure.

| Dispersion Polymer Polyol | Parts by weight | |
|---|---|---|
| | (a) | (b) |
| (ex Example 1) | 100 | 100 |
| Water | 2.17 | 2.6 |
| Diethanolamine | 1.67 | 1.0 |
| SH-209$^x$ | 0.42 | 2.0 |
| SH-214$^x$ | 0.13 | — |
| RC-2037$^y$ | 0.05 | — |
| DC-5043 (silicone surfactant ex Dow Corning) | — | 2.0 |
| RC-2039$^y$ | 0.13 | 0.15 |
| Dibutyl tin dilaurate | 0.08 | 0.1 |
| Toluene diisocyanate (80/20 index) | 103 | 105 |

$^x$ = silicone surfactants ex BP Chemicals Ltd.
$^y$ = amine catalyst ex BP Chemicals Ltd.

The densities of the foams after curing was 32.7 Kg.m$^{-3}$(7(a)) and 30.0 Kgm$^{-3}$ (7(b)).

EXAMPLE 8

Example 7 was repeated except that the product of Example 2 was employed but with 20 parts by weight of melamine were additionally added. The density of the foam after curing was 33.3 kg m$^{-3}$.

EXAMPLE 9

Example 8 was repeated except that the product of Example 4 was used. The density of the foam after curing was 34.4 kg m$^{-3}$.

EXAMPLE 10

Example 1 was repeated except that 55% by weight of the melamine was replaced by anhydrous borax. The product was thereafter used to formulate a polyurethane foam according to the formulation of Example 7(a) above. The product showed a protective glass/char layer after a flame exposure.

EXAMPLE 11

Four polyurethane foam formulation prepared according to Example 7(b) were made. The following polymer polyols were used:
Example 11(a)—dispersion polymer polyol according to Example 1
Example 11(b)—dispersion polymer polyol according to Example 4
Example 11(c)—dispersion polymer polyol according to Example 1 with melamine omitted. 25 parts of melamine per hundred parts of dispersion polymer polyol dispersed afterwards
Example 11(d)—dispersion polymer polyol according to Example 4 with urea omitted. 25 parts of urea per hundred parts of dispersion polymer polyol dispersed afterwards.

Examples 11(a) and 11(c) yielded the same flammability response in the BS 5852 part 2 crib 5 even though the polymer polyol in Example 11(a) had a lower melamine content (20 parts per hundred parts of dispersion polymer polyol). Similar results were obtained when Examples 11(b) (20 php urea) was compared with Example 11(d) (25 php urea).

The results indicate that, lower filler levels are required with the present invention to meet a given flammability response relative to prior art materials.

We claim:
1. A process for preparing a dispersion of a filler in a dispersion polymer polyol, which process comprises the steps of:
   (a) dispersing the filler in a basestock selected from the group consisting of polyether polyols, polyester polyols, polylactone polyols and polytetrahydrofuran polyols;
   (b) thereafter carrying out a dispersion polymerization in the product of step (a) to prepare a dispersion of the filler in a dispersion polymer polyol, said dispersion polymerization being selected from the group consisting of:
      (i) reaction of a polyamine, hydrazine or hydrazide with a mono or polyfunctional isocyanate;
      (ii) reaction of an olamine with an isocyanate;
      (iii) reaction of an epoxide to form a polyepoxide; and
      (iv) reaction of an oxamate to produce a polyoxamate.

2. A process for preparing a dispersion of a filler in a graft polymer polyol, which process comprises the steps of:
   (a) dispersing the filler in a basestock selected from the group consisting of polyether polyols, polyester polyols, polylactone polyols and polytetrahydrofuran polyols;
   (b) thereafter carrying out a graft polymerization in the product of step (a) to prepare a dispersion of the filler in a graft polymer polyol, said graft polymerization being carried out by polymerizing or copolymerizing one or more olefinic monomers in said product of step (a).

3. A process according to claim 1, wherein the dispersion polymer polyol is prepared in step (b) by reaction (i) and wherein the NCO:NH equivalent ratio is in the range of 0.8:1 to 1.05:1.

4. A process according to claim 1, wherein the dispersion polymer polyol is prepared in step (b) by reaction (ii) and wherein the NCO:NH equivalent ratio is in the range of 0.8:1 to 1.1:1.

5. A process according to claim 2, wherein said olefinic monomers are selected from the group consisting of styrene, acrylonitrile and methyl methacrylate, and said graft polymerization is carried out at elevated temperature in the presence of a free radical initiator.

6. A process according to claim 1, wherein the filler is selected from the group consisting of melamine, urea, dicyanodiamide, borax and mixtures thereof.

7. A process according to claim 2, wherein the filler is selected from the group consisting of melamine, urea, dicyanodiamide, borax and mixtures thereof.

8. A process according to claim 6, wherein at least 90% of the melamine, urea, dicyanodiamide or borax is in the form of particles smaller than 15 microns in diameter.

9. A process according to claim 7, wherein at least 90% of the melamine, urea, dicyanodiamide or borax is in the form of particles smaller than 15 microns in diameter.

10. A process according to claim 6, wherein between 1 and 40 parts by weight of melamine, urea, dicyanodiamide or borax are mixed with 100 parts by weight of basestock in step (a).

11. A process according to claim 7, wherein between 1 and 40 parts by weight of melamine, urea, dicyanodiamide or borax are mixed with 100 parts by weight of basestock in step (a).

12. A process for preparing polyurethane foam, which process comprises the step of formulating a dispersion polymer polyol containing dispersed filler prepared by the process defined in claim 1 with a polyfunctional isocyanate, a catalyst for the formation of urethane linkages and a blowing agent.

13. A process for preparing polyurethane foam, which process comprises the step of formulating a graft polymer polyol containing dispersed filler prepared by the process defined in claim 2 with a polyfunctional isocyanate, a catalyst for the formation of urethane linkages and a blowing agent.

* * * * *